United States Patent [19]
Cappon

[11] 3,708,653
[45] Jan. 2, 1973

[54] METHOD AND DEVICE FOR THE DESIGN OF TWO PARAMETER DISTRIBUTION SYSTEM

[76] Inventor: John Cappon, 1 Cathcart Street, Willowdale, Ontario, Canada

[22] Filed: June 28, 1971

[21] Appl. No.: 157,288

[52] U.S. Cl. .............................................235/61 B
[51] Int. Cl. .............................................G06c 3/00
[58] Field of Search........235/61 A, 61 B, 89; 33/1 C, 33/1 SD; 116/130, 119; 35/10, 19 R, 24 R, 24 A, 19 A

[56] References Cited

UNITED STATES PATENTS

| | | | |
|---|---|---|---|
| 1,279,403 | 9/1918 | Morichard | 116/130 |
| 2,230,954 | 2/1941 | Jakosky | 33/1 SD X |
| 3,212,706 | 10/1965 | Prince | 235/89 R |
| 3,453,737 | 7/1969 | Amlinger | 33/1 SD |

Primary Examiner—Richard B. Wilkinson
Assistant Examiner—Stanley A. Wal
Attorney—J. Noel Walton

[57] ABSTRACT

A device and method especially suited for use in the design of a cable television signal distribution system includes a chart having mutually perpendicular axes representing the signal intensities at the Channels 2 and 13 picture carrier frequencies respectively. Modules representing individual components of the distribution system are each dimensioned to correspond to the loss of signal strength at each of the two reference frequencies on passage of a signal through the corresponding component. Each module is positioned on the chart with one of its corners at a point on the chart corresponding to the input signal strengths for the particular component. The signal strengths at the output of that component can then be read from the chart by reference to the position of a second corner of the module on the chart. By the use of L-shaped modules to represent a signal-dividing component and by positioning an outer corner between the legs of the module at a point on the chart corresponding to the input signal strengths for the particular component, an inner corner between the legs of the module is then positioned on the chart at a point corresponding to the signal strengths at the through-line output of the component while the legs of the module have such lengths that the signal strengths at a branch or tap output of the component can be read from the chart scales for the point of intersection of projections of the end edges of the legs of the module.

26 Claims, 7 Drawing Figures

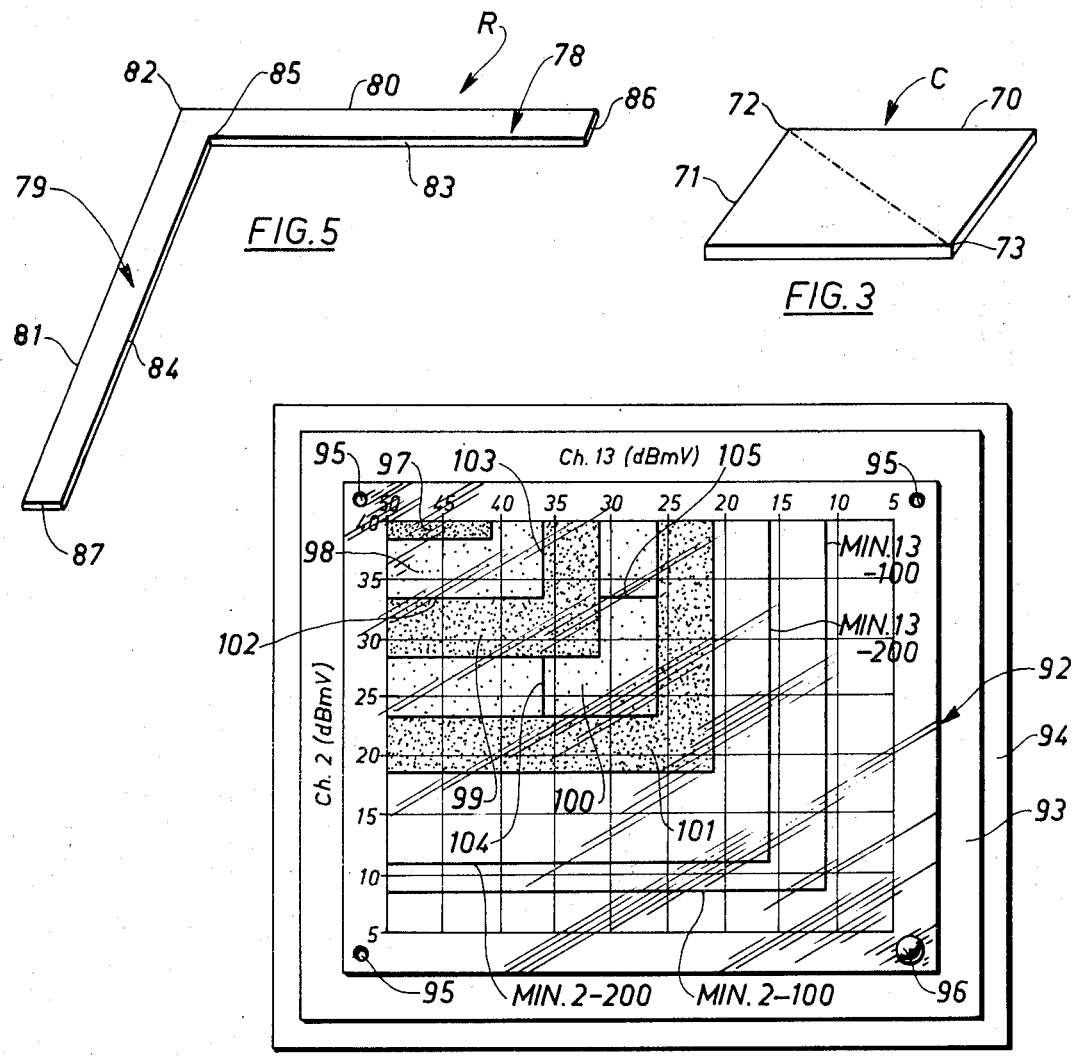
FIG. 5
FIG. 3
FIG. 7
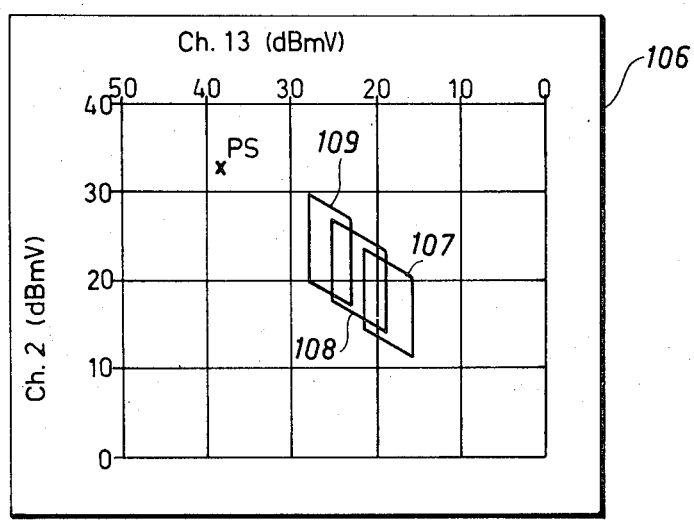
FIG. 6
INVENTOR:
John Cappon
BY- J. N. Walton

METHOD AND DEVICE FOR THE DESIGN OF TWO PARAMETER DISTRIBUTION SYSTEM

BACKGROUND OF THE INVENTION

The present invention relates to a method and devices for determining the values of two variable parameters at any desired location within a distribution system throughout which system the parameters have varying values. More particularly, this invention relates to a method and devices of the aforesaid type and which method and devices are particularly useful in the design of a cable television signal distribution system.

With the continuously increasing adoption of cable television signal distribution systems, there is a correspondingly growing need for a method and device which will facilitate the design of such a system thereby to reduce the considerable time presently involved in calculating the signal strengths at various locations throughout such a system so as to ensure that each and every subscriber to the system receives the best possible service while reducing to the greatest possible extent the number of relatively expensive system components such as in-line amplifiers which are required.

Although there has in recent years been increasing use of computers for carrying out the relevant design calculations, such use of computers is, of course, relatively expensive and the preparation of the necessary programmes and input data for a computer requires considerable time and effort, with the concomitant risk of human error. Additionally, such use of a computer in such design calculations is undesirable in that it eliminates the potential for compromise which is possible when design decisions are made on a human basis.

It is accordingly a principal object of this invention to provide a method and device of the aforesaid type which method and device are especially applicable to use in the design of a cable television signal distribution system.

Other objects of the invention will become apparent as the description herein proceeds.

SUMMARY OF THE INVENTION

The present invention involves the use of modules representing the various components of a distribution system. Such a module can then be disposed on a chart yet to be described so that changes in the parameter values which occur between an input and an output of a corresponding component of the system can then readily be determined by reference to the chart.

Although the invention is particularly applicable to use in the design of a cable television signal distribution system, it is equally applicable to other distribution systems in which two parameters have values which vary throughout the system. The invention will, however, be described in detail herein with reference to its use in the design of cable television signal distribution systems.

Broadly, the method of this invention for determining the values of two variable parameters at a desired location within a distribution system throughout which said parameters have varying values comprises the steps of disposing on a chart having mutually angularly oriented first and second scales respectively representing values of said two parameters a module representing a preselected portion of said distribution system and having a first dimension corresponding to the change in the value of one of said two parameters between input and output points of said preselected portion of said distribution system and a second dimension corresponding to the change in the value of the other of said two parameters between said input and output points of said preselected portion of said distribution system, said first and second dimensions of said module being coterminous at first ends thereof at a reference position and being mutually angularly oriented in correspondence with the mutual angular orientation of said first and second scales of said chart and said module being disposed on said chart with said reference position thereof at a position on said chart corresponding to the values of said two parameters at said input point of said preselected portion of said distribution system and with said first and second dimensions of said module disposed parallel to respective ones of said first and second scales of said chart; identifying a read-out position on said chart corresponding to an outer end of a resultant of said first and second dimensions of said module; and reading from said first and second scales of said chart values of respective ones of said two parameters corresponding to said outer end of said resultant of said first and second dimensions of said module, thereby to give the values of said two parameters at said output point of said preselected portion of said distribution system.

As already indicated, the present invention also provides a device for use in carrying out the method of the invention. Such a device can broadly be defined as comprising a chart having recorded thereon mutually angularly oriented first and second scales respectively representing values of the two parameters, and a module representing a preselected portion of the distribution system and having a first dimension corresponding to the change in value of one of said two parameters between input and output points of said preselected portion of said distribution system and a second dimension corresponding to the change in value of the other of said two parameters between said input point and said output point of said preselected portion of said distribution system, said first and second dimensions of said module being coterminous at first ends thereof at a reference position and being mutually angularly oriented in correspondence with the mutual angular orientation of said first and second scales of said chart, whereby, when said module is disposed on said chart with said reference position of said module at a position on said chart corresponding to the values of said two parameters at said input point of said preselected portion of said distribution system and with said first and second dimensions of said module disposed parallel to respective ones of said first and second scales of said chart, a read-out position can be identified on said chart by locating the outer end of a resultant of said first and second dimensions of said module in turn to allow values of respective ones of said two parameters to be read from respective ones of said first and second scales of said chart, the resulting readings being indicative of the values of respective ones of said two parameters at said output point of said preselected portion of said distribution system.

In accordance with another feature of this invention, there is provided a module for use in designing a radio frequency signal cable distribution system, which module can broadly be defined as including a generally planar undersurface and a top surface and which module has indicia visibly recorded thereon to designate a corresponding signal-modifying component of a radio frequency signal cable distribution system, said module having mutually angularly oriented first and second side edges coterminous at a first corner of said module, said first side edge of said module having at least a section thereof with a length corresponding to the change in signal intensity at a first frequency on passage of a radio frequency signal through the corresponding component between an input and an output thereof, said second side edge of said module having at least a section thereof with a length corresponding to the change in signal intensity at a second frequency on passage of a radio frequency signal through the corresponding component between the input and the output thereof, and said module having a second corner disposed at an outer end of a resultant of said sections of said first and second side edges of said module.

Other particular features of the invention as well as the advantages resulting from its utilization will become apparent as the description herein proceeds.

BRIEF DESCRIPTION OF THE DRAWINGS

The invention will now be described merely by way of illustration with reference to the accompanying drawings in which:

FIG. 3 is an enlarged perspective view of one of the modules shown in FIG. 2;

FIG. 5 is an enlarged perspective view of one of the modules shown in FIG. 4;

FIG. 6 shows an alternative type of chart for use in the method of this invention and having representations of further relevant parameter values provided thereon; and FIG. 7 illustrates a device in accordance with the invention and including an overlay as an optional additional feature which may be provided.

DESCRIPTION OF THE PREFERRED EMBODIMENTS

Before describing the embodiments of the method, device and modules in accordance with this invention as illustrated in FIGS. 2 to 7 of the accompanying drawings, that part of a cable television signal distribution system shown in FIG. 1 will first be described and the manner in which the invention is applied to the design of that system will then be explained.

Figure 1:
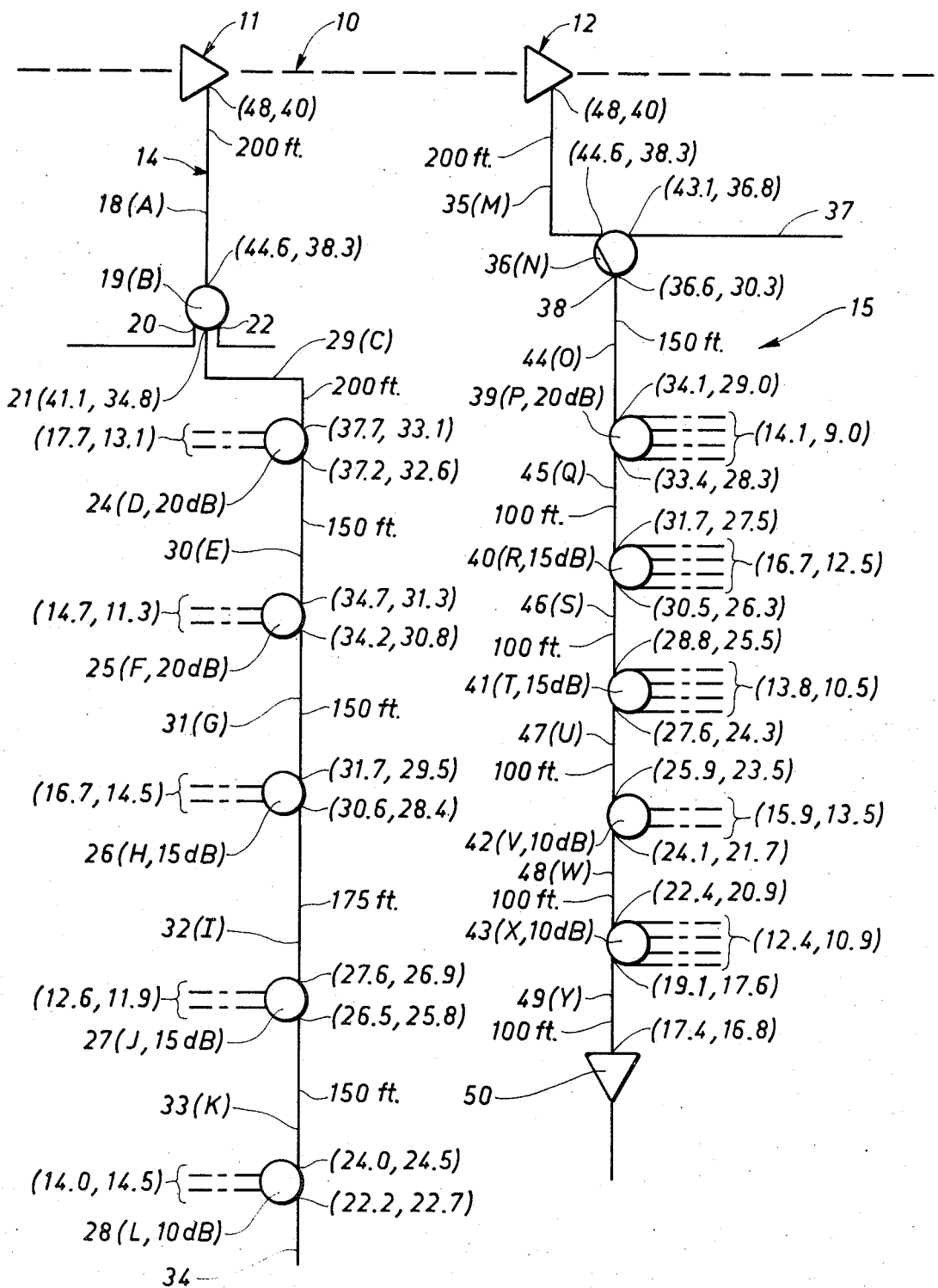
FIG. 1 is a schematic diagram of part of a cable television signal distribution system showing a trunk line of that system as well as fragmentarily showing two distribution line sections extending from the trunk line.

The cable television distribution system shown in FIG. 1 includes a trunk distribution line generally indicated at 10 and extending from a cable television head-end which will frequently include community antenna television signal-receiving equipment. Two bridger-amplifiers generally indicated at 11 and 12 are shown as being provided in a conventional manner in the trunk line 10 and distribution line sections generally indicated at 14 and 15 are shown as extending from the bridger-amplifiers 11 and 12 respectively. Other distribution lines or distribution line sections (not shown) will in practice be connected to the trunk line 10 at spaced apart locations therealong as is conventional. Further amplifiers, such as the bridger-amplifiers 11 and 12, will be provided, as required, along the trunk line 10 so as to ensure that adequate signal is provided to each and every such additional distribution line or distribution line section connected thereto.

The distribution line section 14 shown in FIG. 1 includes a first cable 18 having a length of 200 feet and extends from the output of the bridger-amplifier 11 to a conventional three-way splitter 19 having three outputs indicated at 20, 21 and 22. The separate distribution lines connected to the splitter outputs 20 and 22 are shown fragmentarily and will not be described further herein. The distribution line extending from the splitter output 21 is shown in FIG. 1 as including five two-way tap-offs 24, 25, 26, 27 and 28. The two tap outputs of each of these tap-offs are utilized to provide service to individual subscribers served by the system and are accordingly located at appropriate positions along the distribution line section 14. It will particularly be noted from FIG. 1 that a cable 29 extends from the output 21 of the splitter 19 to the input of the tap-off 24 while cables 30, 31, 32 and 33 serially interconnect the tap-offs 24, 25, 26, 27 and 28. A further cable 34 is shown fragmentarily as extending from the output of the tap-off 28. Further tap-offs can, of course, be provided in the cable 34. It will also be noted from FIG. 1 that the aforementioned cables have the following lengths:

| Cables 18 and 29 | 200 feet |
| Cable 32 | 175 feet |
| Cables 30, 31 and 33 | 150 feet |

The several tap-offs in the distribution line section 14 and their operating characteristics will be considered in further detail hereinafter.

The distribution line section 15 includes a directional coupler 36 connected to the bridger-amplifier 12 by a cable 35 having a length of 200 feet. The through line output of the directional coupler 36 is shown as being connected to a cable 37 which extends to one or more further distribution or feeder lines (not shown). The branch output 38 of the directional coupler 36 is shown in FIG. 1 as being connected to a distribution line including five tap-offs 39, 40, 41, 42 and 43. It will be seen that tapoff 42 has two tap outputs while the remaining tap-offs are four-way ones. Accordingly, each of those remaining tap-offs has four tap outputs. It will also be noted that a cable 44 having a length of 150 feet connects the branch output 38 of the directional coupler 36 to the input of the tap-off 39 while cables 45, 46, 47 and 48, each having a length of 100 feet, serially interconnect the individual tap-offs 39, 40, 41, 42 and 43. A 100-foot cable 49 extends from the through output of the tap-off 43 to a distribution line amplifier 50.

During their passage through the various cables and components, such as directional couplers, splitters and tap-offs, constituting the distribution system, the signals being distributed therethrough will, as is well known, suffer progressive attenuation and it is for this reason that amplifiers, such as amplifiers 11, 12 and 50, are provided at appropriate positions throughout the system. The extent to which amplifiers need to be provided in a distribution system such as that shown in FIG. 1 depends of course to a very considerable extent on the disposition, number and characteristics of the components such as splitters, directional couplers and tap-offs in the system. Other factors yet to be considered are, however, also significant. It will further be understood that components such as directional couplers, splitters and tap-offs are utilized whenever it is required to divide a signal between two or more lines of the system. Accordingly, such components will be identified generally herein as "signal-dividing components" or "signal dividers."

The design of a cable distribution system such as the system shown in FIG. 1 of the accompanying drawings involves the careful selection of components such as directional couplers, splitters and tap-offs so as to ensure that each subscriber receives satisfactory signal strength while requiring the use in the system of a minimum number of amplifiers and other relatively expensive system components. In designing such a distribution system, the designer has a wide range of components with different operating characteristics available to him and he must select from such available components those which will provide the desired performance in the most effective, efficient and economic manner. For example, directional couplers, splitters and tap-offs giving different distributions of an input signal between the several output lines of such a component are available. For example, a designer must also pay attention to the fact that, if he selects a directional coupler which provides a greater signal strength to a branch line extending from that coupler, then less signal strength will remain for the through line and additional amplifiers might well then need to be provided in the through line. Alternatively, by using a signal divider, such as a directional coupler, which provides less signal strength to its branch output, fewer subscribers can then be served from the distribution line connected to the branch output unless one or more distribution line amplifiers are connected in that distribution line. The signal strength which is required in a distribution line will, of course, in turn depend on many factors of which there may be mentioned the length of that line, the number of tap-offs connected in that line, and the minimum and maximum acceptable signal strength levels to be made available to each subscriber served by that line. The minimum and maximum signal strength levels required at a tap output of any tap-off in a distribution line will also be determined by reference to the length of drop-line or lead-in cable which will be connected to that tap output.

It should also be understood that the changes in signal intensity which occur on passage through some of the components of a distribution system, such as that shown in FIG. 1, will be different at different frequencies. For this reason, it is customary, when designing such a system, to calculate the signal strengths and losses for two different signal frequencies. In contemporary cable television systems, such calculations are usually made for frequencies of 55.25 MHz and 211.25 MHz, these being the frequencies of the picture carrier signals for existing television Channels 2 and 13 respectively.

As already explained, it has heretofore been conventional to select components such as splitters, directional couplers and tap-offs for use in cable television signal distribution systems by lengthy calculations on the basis of the known operating characteristics of the available components. Regardless of whether such calculations are made manually or by means of a computer, they require considerable time to complete and consequently increase the design cost and the risk of error. Furthermore, computer calculation often precludes compromise and is often somewhat lengthy since the computer will often consider design possibilities which will be eliminated in manual design as being obviously impractical.

The manner in which the present invention facilitates the design of a distribution system such as that shown in FIG. 1 while still allowing the benefits of personal judgment to be obtained will now be explained first with reference to FIGS. 2 and 3 of the accompanying drawings, which figures show a particularly simple embodiment of a device in accordance with the present invention. As previously indicated, FIG. 2 refers solely to one part of the distribution line section 14 of the system shown in FIG. 1. More particularly, FIG. 2 refers to that part of the distribution line section 14 which extends from the output of the bridger-amplifier 11 to the through output of the tap-off 28. The signals from the outputs 20 and 22 of the splitter 19 are not, however, represented in FIG. 2. Merely by way of illustration, it can be indicated that the splitter 19 is considered to be one which provides a signal strength attenuation of 3.5 db between its input and its output 21 at each of the aforementioned reference frequencies of 55.25 MHz and 211.25 MHz.

Figure 2:
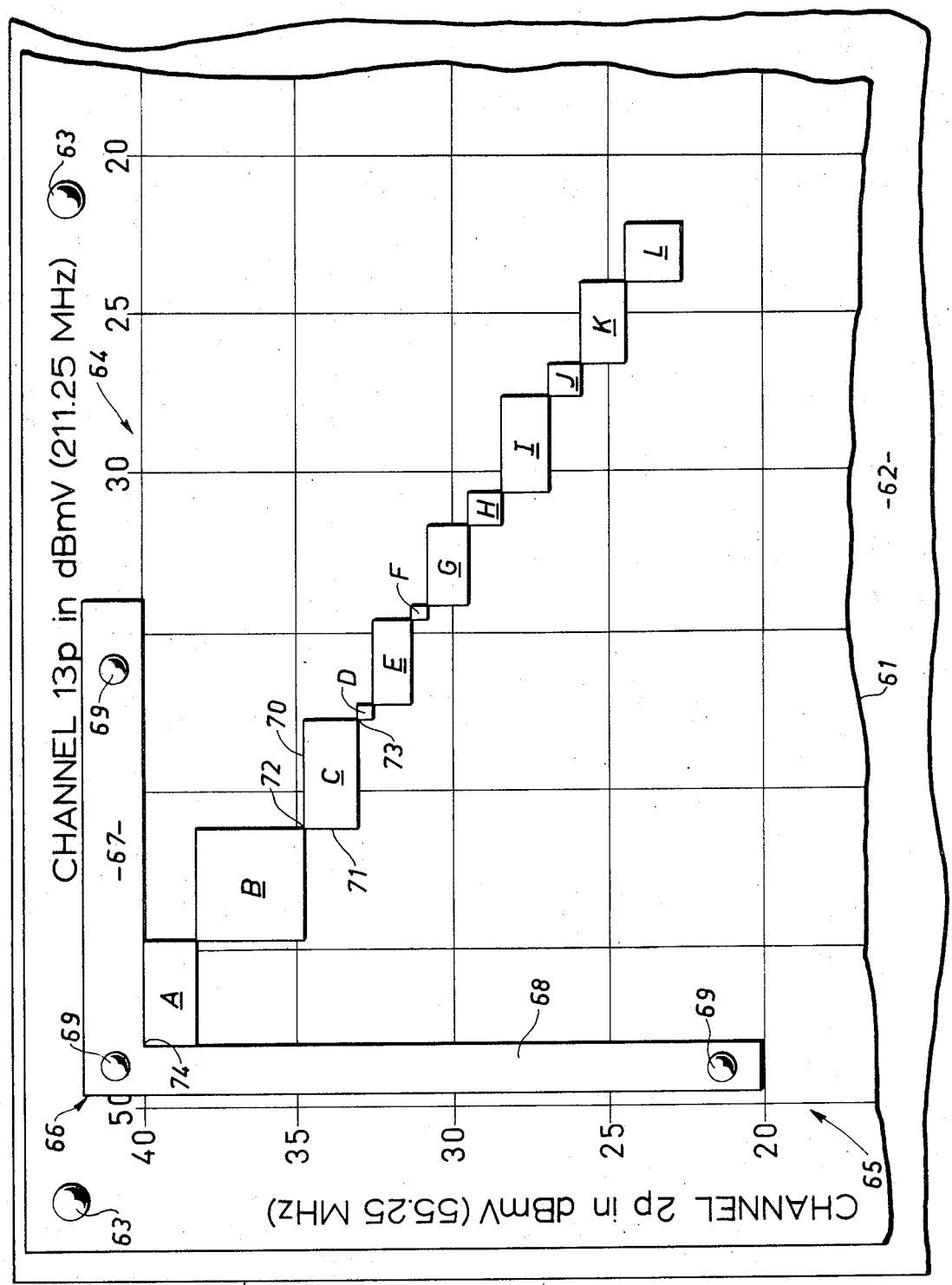
FIG. 2 is a fragmentary plan view of one embodiment of a device in accordance with the present invention and showing modules of the device disposed on a chart, the particular modules shown representing the various components of part of one of the distribution line sections of the system shown in FIG. 1.

The device in accordance with the invention and generally indicated at 60 in FIG. 2 of the drawings includes a chart 61 which is optionally secured to a backing board 62 by thumb tacks 63. The chart 61 has printed on its upper surface first and second logarithmic Cartesian scales 64 and 65. The ordinate scale 65 represents the signal intensity in dBmV at the aforementioned Channel 2 picture carrier frequency of 55.25 MHz while the abscissa scale 64 represents the signal intensity of the Channel 13 picture carrier frequency of 211.25 MHz in the same units. The signal strength level at any point on the chart 61 can then be reported as the Cartesian co-ordinates $(x, y)$ of that point where $x$ represents the Channel 13 picture signal intensity in dBmV and $y$ represents the Channel 2 picture signal intensity in dBmV. It should, however, be appreciated that it is not essential that the two axes have identical scales. This invention involves the disposition on the chart 61 of modules representing the various components of the portion of the actual distribution system being designed so that the signal strength levels at the two specified frequencies at any position in the system can be read for corresponding points on the chart 61. The manner in which this is done will be explained in more detail hereinafter. Before such an explanation is given, it should, however, be noted that, to facilitate understanding of the invention, the signal strength levels at various positions throughout the system illustrated are numerically indicated in FIG. 1 in the form of the aforementioned ($x$, $y$) co-ordinates.

Referring now in greater detail to the device 60 shown in FIG. 2, it will be -foot that it includes a plurality of modules A through L which are freely positionable as required on the chart 61. Each of the aforementioned modules A through L represents a given signal-modifying component of the distribution line section 14. To facilitate understanding further, the module legends are shown parenthetically against the corresponding component legends on FIG. 1. In particular, it will be seen that the module A represents the 200-foot length of cable 18 extending from the branch output of the bridger-amplifier 11 to the input of the splitter 19. The module B represents the losses in signal strength which occur between the input of the splitter 19 and the outlet 21 thereof. The modules D, F, H, J and L represent respective ones of the tap-offs 24, 25, 26, 27 and 28. The module C represents the 200-foot cable 29 between the output 21 of the splitter 19 and the input of the tap-off 24 while the module E represents the 150f-foot cable 30 between the through output of the tap-off 24 and the input of the tap-off 25. Similarly, the modules G and K represent the 150-foot lengths of cable between the tap-offs 25, 26 and 27, 28 respectively while the module I represents the 175-foot cable 32 between the tap-offs 26 and 27. The actual signal strength values referred to herein with reference to the drawings are based on the use of foamed dielectric, aluminum sheath line cable having an outside diameter of 0.412 inch. The invention is not, of course, restricted in any way to the use of that particular size of cable.

Referring now to FIG. 3, it will be seen that the module C shown therein and representing the 200-foot cable 29 between the output of the splitter 19 and the input of the tap-off 24 has a generally rectangular configuration with first and second sides or dimensions 70 and 71 which are coterminous at a first corner or reference position 72 of the module. The length of the first side 70 of the module C corresponds to the loss of signal strength at the Channel 13 picture carrier frequency of 211.25 MHz as a signal passes through the 200-foot cable 29, the dimensional scale being the same as that of the abscissa 64 of the chart 61. Similarly, the length of the second side 71 of the module C corresponds to the loss of signal strength through the 200-foot cable 29 at the Channel 2 picture carrier frequency of 55.25 MHz. It will now be understood that, if the module C is placed on the chart 61 with its side 70 parallel to the Channel 13 axis 64, with its side 71 parallel to the Channel 2 axis 65 and with its first corner 72 at a position on the chart 61 corresponding to the Channels 2 and 13 signal strengths at the input end of the cable section 29 (i.e. the signal strengths at the output 21 of the splitter 19), the signal strengths for the two frequencies at the second or other end of the cable section 29, i.e. at the tap-off 24, can then be read from the chart 61. In particular, it will be understood that the corner 73 of the rectangular module C diagonally opposite to the first corner 72 thereof will then be disposed on the chart 61 at a position corresponding to the signal strengths at the second end of the cable section 29. Adopting the terminology of vector analysis, the corner 73 can be defined as being disposed at the outer end of the resultant of the sides 70 and 71 of the module C. Similar considerations apply to all the modules A through L.

Assuming that it is known that the signal strength level at the branch outputs of each of the bridger-amplifiers 11 and 12 is (48,40), i.e. 48 dBmV at 211.25 MHz and 40 dBmV at 55.25 MHz, the module A representing the 200-foot cable 18 can then be positioned as already described on the chart 61 so that its top left-hand corner or reference position is disposed at a point having those co-ordinates. Consequently, the lower right-hand corner of the module will then be disposed at a point on the chart having co-ordinates corresponding to the signal strength level at the input of the splitter 19. Then, by placing the module B with its top left-hand corner at the same position as the bottom right-hand corner of the module A and with its sides parallel to the axes 64 and 65, the bottom right-hand corner of the module B will be disposed at a point on the chart 61 having coordinates corresponding to the signal strength level at the output 21 of that splitter. Similarly, by positioning the remaining modules C through L on the chart 61 in serial diagonal continuity as shown in FIG. 2, the signal strength levels at any position in the distribution line section 14 can readily be read from the chart.

Figure 4:
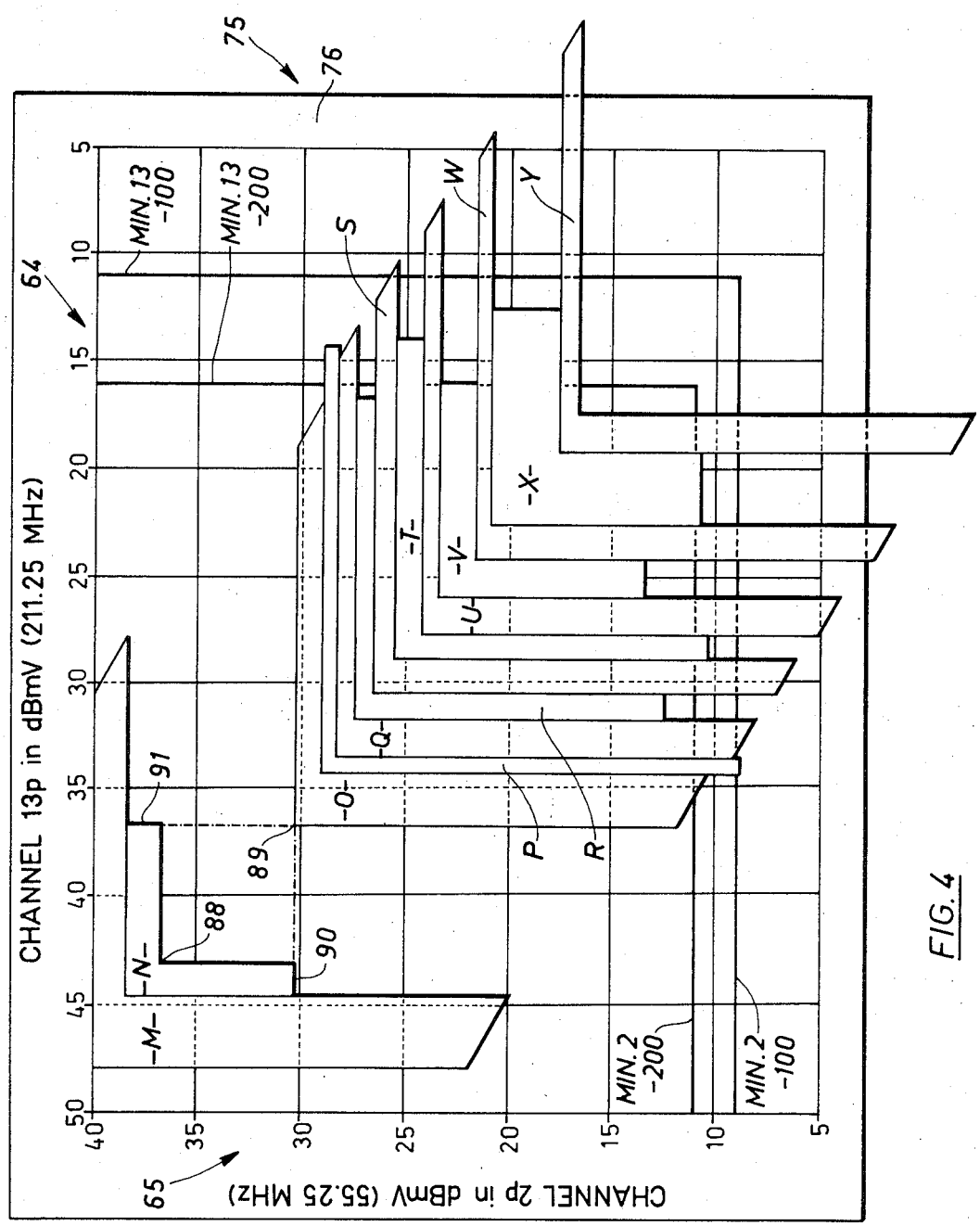
FIG. 4 is a plan view similar to that of FIG. 2 but illustrating the use of a particularly preferred type of module, the several modules representing the various components of part of a second one of the distribution line sections of the system shown in FIG. 1.

The device 60 is shown in FIG. 2 as including an L-shaped guide 66 including mutually perpendicular legs 67 and 68 which meet at an inside right angle corner 74. The guide 66 has openings therethrough so that it can be secured in a desired fixed position on the chart 61 by thumb tacks 69 so that its inside corner 74 is positioned on the chart 61 in such a way that it serves to locate the first module, for example, module A, of a series of such modules at a desired position as will readily be understood by reference to FIG. 2. It should perhaps further be explained that the guide 66 will also have utility in the device in accordance with the invention as shown in FIG. 4 and yet to be described herein. It is, however, equally within the scope of this invention to provide a device in accordance therewith with other types of guides.

The operating characteristics of tap-offs, such as the tap-offs 24, 25, 26, 27 and 28 used in the system shown in FIG. 1, are generally expressed by giving the signal strength attenuation between the input and each of the tap-off outputs of such a component. For example, a 20 dB two-way tap-off is one which gives a 20 dB attenuation of the input signal at each of the two reference frequencies between the input and each of the two tap-off outputs. Referring further to FIG. 1, it will be seen that such characteristics for all the tap-offs shown therein are indicated parenthetically after the component legends on that figure. More particularly, it will be seen that each of the tap-offs 24 and 25 gives a 20 dB attenuation while both the tap-offs 26 and 27 are rated at 15 dB and the tap-off 28 is rated at 10 dB. The resulting tap-off signal strengths are also given on FIG. 1. It should perhaps be further explained that the tap-offs used in the distribution line section 14 of the system of FIG. 1 are selected so that the tap-off signal strength levels for the tap-offs 25, 27 and 28 are suitable for use with 100-foot drop-line or lead-in cables while the tap-offs 24 and 26 are intended for use with 200-foot drop-line or lead-in cables. The aforementioned references to the use of specific lengths of drop-line or lead-in cables are predicated on the use of the specific type of such cable presently available under the description "RG-59." It should, however, be appreciated that the invention is equally applicable to distribution systems using other types of cables. With the use of such other cable types, numerical signal strength values different from those specifically quoted herein will often apply.

Referring now to FIGS. 4 and 5 of the accompanying drawings, it will be seen that the alternative device in accordance with the invention as generally indicated at 75 in FIG. 4 has many features in common with the device 60 shown in FIG. 2. In particular, it will be noted that the device 75 includes a chart 76 which is almost identical with the chart 61 of the device 60. The chart 76 differs from the chart 61 only in that lines MIN. 13-100 and MIN. 13-200, and MIN. 2-100 and MIN. 2-200 are provided on the chart parallel to the axes 65 and 64 respectively thereof, suitably by printing. The reason these lines are provided will be explained in greater detail as the description herein proceeds.

It will further be noted from FIG. 4 that thirteen modules M through Y are disposed on the chart 76 and that each of those modules has a generally L-shaped configuration. The module M represents the 200-foot cable 35 extending from the output of the bridger-amplifier 12 to the input of the directional coupler 36 while the module N represents the directional coupler 36 itself. The module O represents the 150-foot cable 44 while modules P, R, T and X represent the four-way tap-offs 39, 40, 41 and 43 respectively while the module V represents the two-way tap-off 42. The 100-foot lengths of cable 45, 46, 47 and 48 serially interconnecting the tap-offs are represented by the modules Q, S, U and W respectively. The 100-foot cable 49 connecting the through output of the tap-off 43 to the distribution line amplifier 50 is represented by the module Y.

Referring now to FIG. 5 of the accompanying drawings, it will be seen therefrom that the module R representing the four-way tap-off 40 is shown enlarged in that figure. The module R includes a first leg generally indicated at 78 and perpendicular thereto a second leg generally indicated at 79. The first leg 78 of the module R has an outer or first side or dimension 80 which is coterminous with the outer or first side or dimension 81 of the leg 79 of the module at a first corner or reference position 82 of the module. The legs 78 and 79 have inner side edges 83 and 84 respectively which meet at an inner corner 85. The leg 78 has a width corresponding to the signal strength attenuation of 1.2 dB at the Channel 2 picture carrier frequency between the input of the tap-off 40 and its through output at the same dimensional scale as the scale 65 of the chart 76. Similarly, the leg 79 of the module R has a width corresponding to the signal strength attenuation of 1.2 dB at the Channel 13 picture carrier frequency between the input of the tap-off 40 and its through output at the same dimensional scale as the scale 64 of the chart 76. It will now be understood that the right quadrilateral portion of the module R common to both the legs 78 and 79 thereof can be utilized in the same manner as each of the modules A through L already described herein is used while the extended legs 78 and 79 of that module will serve to facilitate the correct mutual positioning or nesting of the modules on the chart 76. Insofar as modules representing components which do not effect any division of their input signals are concerned, the legs of the corresponding modules have no other purpose and such modules can be recognized in FIG. 4 as those having the outer ends of their legs cut obliquely. For example, the module M serves simply to permit a graphical determination of the signal intensities at both the Channels 2 and 13 picture carrier frequencies at the input to the directional coupler 36.

In accordance with a particularly useful feature of this invention, the modules representing signal-dividing components as exemplified by the directional coupler 36 and the tap-offs 39, 40, 41, 42 and 43 are formed with third and fourth dimensions corresponding to the attenuations of the input signal strengths at respective ones of the Channels 2 and 13 picture carrier frequencies between the input of the component and the appropriate branch or tap-off output thereof. For example, the leg 78 of the module R shown in FIG. 5 is dimensioned so that the distance between the outer edge 81 of the leg 79 and the outer end edge 86 of leg 78 corresponds to the loss of signal strength at the Channel 13 picture carrier frequency between the input of the tap-off 40 and each of the tap-off outputs of that component on the same dimensional scale as the scale 64 of the chart 76.

Similarly, the length of the leg 79 between the outer edge 80 of the leg 78 and the outer end edge 87 of the leg 79 will correspond to the signal strength attenuation at the Channel 2 picture carrier frequency on the same dimensional scale as the scale 65 of the chart 76 between the input of the tap-off 40 and each of the tap-off outputs of that tap-off.

Although all the tap-offs described herein are indicated as being ones which cause equal attenuation of signal strength at the two reference frequencies on passage of a signal between the input and each of the tap outputs of such a tap-off, it should be understood that the invention is equally applicable to tap-offs of the so-called "sloped" type and which cause different signal strength attenuations at the two frequencies. It will further be understood that a tap-off with such a "-sloped" characteristic can be represented by a module similar to module R but having legs of unequal lengths and generally of unequal widths.

It will now be understood that, by placing the module R on the chart 76 with its first corner or reference position 82 at a point on that chart corresponding to the input signal strengths at the input of the tap-off 40, the through signal strengths to the cable 46 will be those corresponding to the position on that chart of the inner or second corner 85 of the module. Additionally, the signal strength levels at the two reference frequencies at each of the tap-off outputs can be read from the scales 64 and 65 of the chart as the positions along those scales of the leg end edges 86 and 87 respectively.

Further utilization of this particular feature is illustrated in FIG. 4 in the case of the module N representing the directional coupler 36. By comparing FIGS. 1 and 4, it will be seen that the inner corner 88 of the module N represents the signal strength level at the beginning of the cable 37 while the signal strength level at the beginning of the cable 44 is represented by the point 89 on the chart, which point is located at the intersection of linear projections of the end edges 90 and 91 of the legs of the module N.

It will now be understood that, by utilizing modules of the types shown in FIGS. 4 and 5, the present invention permits a rapid determination of the signal strength at any position in a distribution line of a cable television signal distribution system including serially interconnected components as well as at branch and tap outputs of such a distribution line. This is particularly useful since, as previously indicated, it is generally necessary to optimize the signal strengths at such branch and tap outputs.

As previously indicated, the drop-line cables extending from the tap-off outputs of a distribution line to subscribers' receivers often have lengths of 100 or 200 feet and, in designing the distribution system, it is necessary for the designer to ensure that signal strengths within certain predetermined ranges are made available to each and every subscriber. With lower signal strength levels, receiver operation will frequently be unsatisfactory due to the resulting low signal:noise ratio while, with too great a signal strength, distortion will frequently occur. In accordance with yet a further feature of this invention, lines are provided on the chart 76, for example, by printing thereon, to indicate the minimum signal strengths which must be available at any tap-off output if the subscriber served by that output is to receive adequate signal strength at his receiver for the length of drop-line cable actually to be used. Referring further to FIG. 4, it can be explained that the line indicated MIN. 13-100 represents the minimum acceptable Channel 13 picture carrier frequency signal strength (11.0 dBmV) at a tap-off output where a 100-foot drop-line will be used while the line identified MIN. 13-200 represents the minimum acceptable Channel 13 picture carrier frequency signal strength (16.0 dBmV) at a tap-off output where a 200-foot drop-line is to be used. Similarly, the lines identified MIN. 2-100 and MIN. 2-200 represent the minimum acceptable signal strengths at the Channel 2 picture carrier frequency of 8.5 dBmV and 11.0 dBmV for drop-lines having lengths of 100 and 200 feet respectively.

The manner in which the device 75 is used in the designing of a distribution system will be better understood by further considering the characteristics of the tap-offs 39, 40, 41, 42 and 43 as represented by the modules P, R, T, V and X respectively. The tap-off 39 shown is of the type giving a 20 dB loss at both the Channel 2 and Channel 13 picture carrier frequencies between the input to the tap-off and each of its outputs while both the tap-offs 40 and 41 give corresponding losses of 15 dB and the tap-offs 42 and 43 are rated at 10 dB. From FIG. 4, it will be seen that the ends of the legs of the module R representing the tap-off 40 are disposed completely inwardly of both the lines MIN. 2-200 and MIN. 13-200. Accordingly, adequate signal strength for a 200-foot drop-line will be available from the tap-off 40. On the other hand, the end of at least one of the legs of each of the modules P, T, V and X representing the tap-offs 39, 41, 42 and 43 respectively is disposed between the lines MIN. 2-200 and MIN. 2-100 and/or between the lines MIN. 13-200 and MIN. 13-100. Accordingly, adequate signal strengths will be obtained from such tap-offs by the use of 100-foot drop-lines but not by the use of 200-foot cables unless the Channel 13 signal strength of 15.9 dBmV at each of the tap outputs of the tap-off 42 is considered to be sufficiently close to the 16.0 dBmV value of the line MIN. 13-200 to permit the use of a 200-foot drop-line as a compromise. If tap-offs having the same characteristics as the tap-offs 40 and 41 (i.e. a 15 dB loss) were used instead of the tap-offs 42 and 43 as represented by the modules V and X respectively the ends of the legs of such modules would then be disposed outside both the lines MIN. 13-100 and MIN. 2-100. As a result, the use of tap-offs with 15 dB loss characteristics would provide inadequate signal strength even with 100-foot drop-lines for at least one frequency.

Using the device 75 of FIG. 4, it is a very simple matter for a designer to position modules representing the various available components on the chart 76 in nested disposition thereon as shown and then to determine by observation of the modules whether adequate signal strengths will be available where required by the use of such components. In this way, the use of the device greatly facilitates the designer's selection of suitable components.

Referring further to the module X representing the tap-off 43, it will be noted that the signal strength level available at the tap-off outputs of that component are sufficient provided that a 100-foot drop-line can be used. If a 200-foot drop-line were required, it would then obviously be necessary to use a tap-off giving even less attenuation between its input and its tap-off outputs or to include a distribution line amplifier in the distribution line before the tap-off 43.

Although the minimum signal strengths provided to individual subscribers are subject to statutory regulation in some countries, different values for such minimum levels within the regulations but above the minimum values specified therein are adopted by different system operators. For this reason, it might be preferred not to provide the charts used in the device and method of this invention with permanently printed lines such as the lines MIN. 2-100, etc, as already described herein with reference to FIG. 4 of the accompanying drawings. Furthermore, such minimum signal strength lines can be provided in accordance with another useful feature of this invention on a transparent overlay which can be positioned over the chart of a device before the various modules are disposed thereon.

Such a transparent overlay is indicated generally at 92 in FIG. 7 as being disposed over a chart 93 which is itself supported on a backing board 94. The chart 93 is essentially identical to the chart 61 already described herein but is provided with mounting holes (not shown) which can be aligned with corresponding mounting holes 95 provided in the overlay 92 so as to receive thumb tacks 96 by means of which both the chart 93 and the overlay 92 can be secured to the board 94 in correctly aligned positions thereon.

The overlay 92 has printed thereon four lines MIN. 2-100, MIN. 2-200, MIN. 13-100 and MIN. 13-200 corresponding to the lines provided on the chart 76 shown in FIG. 4. Additionally, lines (not shown) identifying the maximum signal strength levels which are generally considered as being acceptable for the corresponding lengths of drop-line cable can, if desired, be provided on such an overlay. In accordance with yet another feature of this invention, the overlay 92 is printed or otherwise marked with transparent bands 97, 98, 99, 100 and 101 which are spaced apart from the lines MIN 2-100 and MIN. 13-100 to predetermined minimum distances. For example, the band 98 is defined by lower and right-hand edges 102 and 103 respectively which are spaced from respective ones of the aforementioned lines MIN. 2-100 and MIN. 13-100 respectively by distances corresponding to signal strength differences of 25 dB at each of the corresponding two reference frequencies. It will now be understood that, if a module representing a tap-off or other signal-dividing component of the system and giving a 25 dB loss of signal strength between its input and each of its tap or branch outputs is positioned on the chart so that its first corner or reference position falls within the band 98, then it follows that a signal strength at each of the two reference frequencies greater than the minimum values represented by the lines MIN. 2-100 and MIN. 13-100 will be available. For the particular overlay 92 shown in FIG. 7, the band 101 similarly corresponds to 10dB loss components while bands 100, 99 and 97 correspond to component losses of 15, 20 and 30 dB respectively. It has been found in practice that it is simpler, when using a device and method in accordance with the invention, to determine whether the reference corner or position of a module, such as the reference corner 82 of the module R of FIG. 5, falls within a band such as the bands shown in FIG. 7 than it is to inspect the legs of such a module to determine the positions on the chart of the end edges of those legs as already described herein with reference to FIG. 4.

It must be stressed, however, that the bands provided on the overlay 92 shown in FIG. 7 will only apply when a 100-foot drop-line can be used. If, for a particular subscriber, a 200-foot drop-line is required, reference would then need to be made to the positions on the chart of the end edges of the legs of the particular module relative to the lines MIN. 2-200 and MIN. 13-200. Similarly, the end edges of the legs of a module are used to ensure that an excessive signal strength level is not provided to any subscriber. Alternatively, such bands can be terminated as at 104 and 105 for the band 100 for the same purpose.

The bands 97, 98, 99, 100 and 101 can, if desired, be of different colors so that they can be readily identified. Similarly, modules representing different types of system components or components with different characteristics can also be color coded. On this matter, attention is again drawn to FIG. 4 from which it will be seen that the modules M, O, Q, S, U, W and Y representing cables are at least partially transparent to allow the underlying chart to be seen through such modules while the modules N, P, R, T, V and X are essentially opaque. Such use of opaque modules to represent signal-dividing components has been found to be advantageous in that it permits a photograph of the chart with the modules positioned thereon to be taken so as to provide a permanent record of the system design, from which record the various signal strength levels can easily be read at any time.

In designing a cable television signal distribution system, it is conventional to utilize distribution line amplifiers which provide an output signal of a given fixed level at each of the two reference frequencies. Reference will now be made to the alternative chart 106 in FIG. 6 of the accompanying drawings. On that chart, the standard output signal level from such a distribution line amplifier is represented by the point PS which is usefully provided, for example, by printing, on the chart. The signal strength level at the input of a distribution line amplifier will, however, generally need to be within a certain range so as to ensure that the desired operation of the amplifier can be obtained. When a variable gain/variable slope distribution line amplifier is used, its permissible range of input signal strengths can be represented on such a chart by a parallelogram, such as the parallelogram 107 on the alternative chart 106 shown in FIG. 6.

Provided that the input signal strength to the particular distribution line amplifier corresponds to a point which is located within the parallelogram 107, that amplifier can then be adjusted to give an output signal having a signal strength at each of the two reference frequencies as indicated by the point PS. On occasion, the signal intensities at a given point in a distribution line are greater than those indicated by the parallelogram 107 but are so low that additional attenuating components such as tap-offs cannot be included in the line without further amplification. Similarly, it might be desired to incorporate an amplifier before a splitter to avoid the need for a greater number of amplifiers in the output lines from such a splitter, In such situations, it is already known to utilize an amplifier with a signal-attenuating adaptor so as to allow that amplifier to accept a higher strength input signal. Such adaptors are frequently referred to in the trade as "pads" or "equalizers" and pads and/or equalizers with different operating characteristics can be used in a single amplifier to give an even greater range of acceptable input signal strengths. Such broader ranges for the amplifier input signal strength are indicated in FIG. 6 by the parallelograms 108 and 109 printed on the chart 106 and representing the use of two pads with different characteristics. Although the last-mentioned chart shows the parallelograms 107, 108 and 109 as being mutually overlapping, it will be understood that the chart could equally be printed so that the overlapping portions of the parallelograms are divided when the overlay is drawn so that a designer could then readily identify whether or not a pad or more than one pad should be used to obtain optimum amplifier performance.

It will be understood that the various modules used in this invention will normally be provided, for example, by printing on their top surfaces, with indicia indicating the components which they respectively represent.

Although the invention has been described herein with particular reference to the specific embodiments thereof as illustrated in the several figures of the accompanying drawings, it should be understood that numerous modifications of the illustrated arrangements are possible without departing from the scope of the inventive concept. In particular, it should be understood that the various optional features illustrated in the accompanying drawings can be utilized in the method and device of the invention either separately or in various combinations, as desired and as appropriate. Other variations within the scope of the invention will readily be apparent to those conversant with the relevant disciplines.

What is claimed is:

1. A method for determining the values of two variable parameters at a desired location within a distribution system throughout which said parameters have varying values and which method comprises the steps of:

disposing on a chart having mutually angularly oriented first and second scales respectively representing values of said two parameters a module representing a preselected portion of said distribution system and having a first dimension corresponding to the change in the value of one of said two parameters between input and output points of said preselected portion of said distribution system and a second dimension corresponding to the change in the value of the other of said two parameters between said input and output points of said preselected portion of said distribution system, said first and second dimensions of said module being coterminous at first ends thereof at a reference position and being mutually angularly oriented in correspondence with the mutual angular orientation of said first and second scales of said chart and said module being disposed on said chart with said reference position thereof at a position on said chart corresponding to the values of said two parameters at said input point of said preselected portion of said distribution system and with said first and second dimensions of said module disposed parallel to respective ones of said first and second scales of said chart;

identifying a read-out position on said chart corresponding to an outer end of a resultant of said first and second dimensions of said module; and reading from said first and second scales of said chart values of respective ones of said two parameters corresponding to said outer end of said resultant of said first and second dimensions of said module, thereby to give the values of said two parameters at said output point of said preselected portion of said distribution system.

2. A method as claimed in claim 1 for determining the values of said two parameters at each of first and second output points of said preselected portion of said distribution system and in which said first and second dimensions of said module correspond to the changes in the values of respective ones of said first and second parameters between said input point and said first output point of said preselected portion of said distribution system, said module further having third and fourth dimensions corresponding to the changes in the values of respective ones of said two parameters between said input point and said second output point of said preselected portion of said distribution system and said third and fourth dimensions of said module being coterminous at first ends thereof at said reference position, being mutually angularly oriented in correspondence with the mutual angular orientation of said first and second scales of said chart and being disposed parallel to respective ones of said first and second scales of said chart, and which method additionally comprises identifying a second readout position on said chart, said second read-out position corresponding to an outer end of a resultant of said third and fourth dimensions of said module and reading from said first and second scales of said chart values of respective ones of said two parameters corresponding to the said outer end of said resultant of said third and fourth dimensions of said module thereby additionally to give the values of said two parameters at said second output point of said preselected portion of said distribution system.

3. A method as claimed in claim 2 for determining the values of signal intensity at two different frequencies at said first and second output points of a signal divider included in a radio frequency signal cable distribution system and which method comprises disposing on said chart on which said two scales are provided essentially perpendicularly to each other, said module having said first and third dimensions, on the one hand, said and said second and fourth dimensions, on the other hand, essentially perpendicular to each other, said first and second dimensions of said module corresponding to the changes in values of signal intensity at respective ones of said two frequencies between said input point and said first output point of said signal divider and said third and fourth dimensions of said module corresponding to the changes in the values of signal intensity at respective ones of said two frequencies between said input point and said second output point of said signal divider.

4. A method as claimed in claim 3 which comprises disposing a plurality of said modules on said chart in mutually nested disposition and in diagonal serial continuity thereon.

5. A method as claimed in claim 4 which comprises the additional step of preparing a photographic record of said modules disposed on said chart.

6. A method as claimed in claim 1 which comprises serially disposing a plurality of said modules on said chart and reading therefrom respective values of said two parameters at output points of a corresponding plurality of preselected portions of said distribution system.

7. A method as claimed in claim 6 in which an initial one of said modules is disposed on said chart with said reference position thereof disposed on said chart at a position identified thereon and representative of the values of said two parameters at the output point of a preselected component of said distribution system.

8. A method as claimed in claim 1 for determining the values of respective signal intensities at two different frequencies at a preselected location in a radio frequency signal cable distribution system and which method comprises disposing on said chart on which said two scales are provided essentially perpendicularly to each other said module having said first and second dimensions thereof essentially perpendicular to each other, said first and second dimensions of said module corresponding to the changes in values of signal intensity at respective ones of said two frequencies between said input and output points of said preselected portion of said distribution system.

9. A method as claimed in claim 8 in which said first and second dimensions of said module represent the losses in the values of signal intensity at respective ones of said two different frequencies on passage of radio frequency signals between input and output ends of a preselected length of distribution cable forming part of said distribution system.

10. A device for determining the values of two variable parameters at a desired location within a distribution system throughout which said parameters have varying values and which device comprises:
a chart having thereon mutually angularly oriented first and second scales respectively representing values of said two parameters, and
a module representing a preselected portion of said distribution system and having a first dimension corresponding to the change in value of one of said two parameters between input and output points of said preselected portion of said distribution system and a second dimension corresponding to the change in value of the other of said two parameters between said input point and said output point of said preselected portion of said distribution system, said first and second dimensions of said module being coterminous at first ends thereof at a reference position and being mutually angularly oriented in correspondence with the mutual angular orientation of said first and second scales of said chart,
whereby, when said module is disposed on said chart with said reference position of said module at a position on said chart corresponding to the values of said two parameters at said input point of said preselected portion of said distribution system and with said first and second dimensions of said module disposed parallel to respective ones of said first and second scales of said chart, a read-out position can be identified on said chart by locating the outer end of a resultant of said first and second dimensions of said module in turn to allow values of respective ones of said two parameters to be read from respective ones of said first and second scales of said chart, the resulting readings being indicative of the values of respective ones of said two parameters at said output point of said preselected portion of said distribution system.

11. A device as claimed in claim 10 in which said first and second scales of said chart are disposed essentially perpendicularly to each other and in which said first and second dimensions of said module are constituted by respective ones of mutually perpendicular first and second side edges of said module which side edges are coterminous at a first corner of said module, said first corner constituting said reference position, and in which said module has a right quadrilateral portion with a second corner thereof disposed diagonally relative to said first corner whereby said values of said two parameters at said output point can be read from respective ones of said first and second scales of said chart at the positions therealong of said second corner of said module when said first corner of said module is disposed on said chart at a position thereon corresponding to the values of respective ones of said two parameters at said input point of said preselected portion of said distribution system.

12. A device as claimed in claim 11 in which said first and second scales of said chart are logarithmic representations of the variations of the signal intensities at two different frequencies in a radio frequency signal cable distribution system and in which said first and second dimensions of said module represent changes in the values of signal intensity at respective ones of said two different frequencies through a preselected portion of said distribution system.

13. A device as claimed in claim 12 including a plurality of said modules whereby said modules can be disposed on said chart in diagonal serial continuity whereby in turn values of said signal intensities can be determined at output points of a corresponding plurality of preselected portions of said distribution system.

14. A device as claimed in claim 11 in which said module has mutually perpendicular legs extending from said right quadrilateral portion thereof with outer edges of said legs forming linear extensions of respective ones of said first and second side edges of said right quadrilateral portion of said module and with inner edges of said legs coterminous at said second corner of said module.

15. A device as claimed in claim 14 in which said legs of said module have lengths corresponding to changes in the values of respective ones of said two parameters between said input point and a second output point of said preselected portion of said distribution system.

16. A device as claimed in claim 15 in which at least some of said modules are formed of a transparent material.

17. A device as claimed in claim 16 in which each said module representing a preselected portion of said distribution system having a said second output point is formed of an essentially opaque material while each said module representing a preselected portion of said distribution system having only a said first output point is formed of an essentially transparent material.

18. A device as claimed in claim 15 in which said first and second scales of said chart are logarithmic representations of the variations of the signal intensities at two different frequencies in a radio frequency signal cable distribution system, in which said first and second dimensions of said module represent changes in the values of signal intensity at respective ones of said two different frequencies between an input point and a first output point of said preselected portion of said distribution system, and in which said lengths of said legs represent changes in the values of signal intensity at respective ones of said two different frequencies between an input point and a second output point of said preselected portion of said distribution system.

19. A device as claimed in claim 18 including a plurality of said modules whereby said modules can be disposed on said chart in serially nested positions thereon.

20. A device as claimed in claim 19 in which said chart has a predetermined minimum signal intensity level provided thereon for at least one of said two frequencies.

21. A device as claimed in claim 19 in which said chart has provided thereon at least one zone representative of the overall permissible input range of a preselected, variable slope, variable gain signal amplifier.

22. A device as claimed in claim 19 and which device additionally includes a transparent overlay for said chart, said overlay having recorded thereon a predetermined minimum signal intensity level for at least one of said two frequencies.

23. A device as claimed in claim 22 in which said transparent overlay has recorded thereon at least one band corresponding to a predetermined range of signal intensities at each of said two frequencies such that, when a preselected said module is disposed on said overlay with said reference position of said module within said band, the values of signal intensity at each of said two frequencies at said second output point of said preselected portion of said distribution system are at least equal to predetermined values thereof.

24. A module for use in designing a radio frequency signal cable distribution system, which module includes a generally planar undersurface and a top surface and which module has indicia visibly recorded thereon to designate a corresponding signal-modifying component of a radio frequency signal cable distribution system, said module having mutually angularly oriented first and second side edges coterminous at a first corner of said module, said first side edge of said module having at least a section thereof with a length corresponding to the change in signal intensity at a first frequency on passage of a radio frequency signal through the corresponding component between an input and an output thereof, said second side edge of said module having at least a section thereof with a length corresponding to the change in signal intensity at a second frequency on passage of a radio frequency signal through the corresponding component between the input and the output thereof, and said module having a second corner disposed at an outer end of a resultant of said sections of said first and second side edges of said module.

25. A module as claimed in claim 24 in which said module is a generally planar member with said indicia visibly recorded on said top surface thereof and having a generally L-shaped configuration including two mutually perpendicular legs defined by respective pairs of mutually parallel inner and outer edges, said outer edges of said legs being coterminous at said first corner of said module, said inner edges of said legs being coterminous at said second corner of said module, said inner and outer edges of each said leg of said module being mutually spaced apart a distance corresponding to the change in signal intensity at a respective one of said first and second frequencies on passage of a radio frequency signal through the corresponding component between the input and the output thereof.

26. A module as claimed in claim 25 in which each said leg thereof has a length corresponding to the change in signal intensity at a respective one of said first and second frequencies on passage of a radio frequency signal through the corresponding component between the input and a second output of that component.

* * * * *